United States Patent [19]

Tuhro

[11] Patent Number: 5,635,694
[45] Date of Patent: Jun. 3, 1997

[54] SYSTEM AND METHOD FOR EMBEDDING MACHINE CODED DESTINATION INFORMATION INTO A POSTAL MARK

[75] Inventor: Richard H. Tuhro, Webster, N.Y.

[73] Assignee: Xerox Corporation, Stamford, Conn.

[21] Appl. No.: 534,675

[22] Filed: Sep. 27, 1995

[51] Int. Cl.$^6$ .................................................. G06F 17/00
[52] U.S. Cl. .......................................... 235/375; 235/494
[58] Field of Search ................................ 235/375, 492, 235/494

[56] References Cited

U.S. PATENT DOCUMENTS

| | | | |
|---|---|---|---|
| 3,257,545 | 6/1966 | Van Berkel | 235/375 X |
| 4,286,146 | 8/1981 | Uno | 235/456 |
| 4,610,025 | 9/1986 | Blum et al. | 382/9 |
| 4,800,505 | 1/1989 | Axelrod et al. | 364/478 |
| 4,900,903 | 2/1990 | Wright et al. | 235/381 |
| 4,924,078 | 5/1990 | Sant'Anselmo | 235/494 |
| 5,051,779 | 9/1991 | Hikawa | 355/200 |
| 5,060,980 | 10/1991 | Johnson et al. | 283/70 |
| 5,315,098 | 5/1994 | Tow | 234/494 |
| 5,437,441 | 8/1995 | Tuhro et al. | 270/1.1 |

*Primary Examiner*—Harold Pitts
*Attorney, Agent, or Firm*—Michael J. Nickerson

[57] ABSTRACT

A system and method embeds a postal code in a postal mark. The system includes a scanner to input a destination zip code for a piece of mail and a control unit, connected to the scanner, to convert the destination zip code to zip code glyphs and to embed the zip code glyphs into a predetermined portion of a bit map representing the postal mark. A printer then prints the postal mark bit map with embedded zip code glyphs onto the piece of mail. The system also includes a scanner to read the embedded zip code glyphs and a controller to decode the read zip code glyphs. As a result of the decoding, a sorter sorts the piece of mail and directs it to its destination. The postal mark is either a stamp cancellation mark or a postal meter. The system can also be utilized to track mail by including a device which assigns a tracking number to the piece of mail. The control unit then converts the tracking number to track glyphs and embeds the track glyphs into a predetermined portion of the stamp cancellation mark bit map. The printer prints the stamp cancellation mark bit map with the embedded track glyphs and zip code glyphs onto the piece of mail, and scanners read the track glyphs at different points along a mail handling system so that a controller can track and document the progress of the piece of mail through the mail handling system.

3 Claims, 5 Drawing Sheets

SYSTEM AND METHOD FOR EMBEDDING MACHINE CODED DESTINATION INFORMATION INTO A POSTAL MARK

FIELD OF THE PRESENT INVENTION

The present invention is directed to a system and method for esthetically embedding machine readable code representing the destination of a piece of mail into a postal mark. More particularly, the present invention is directed to a system and method for embedding glyphs into a stamp cancellation postal mark or postal metering mark wherein the glyphs represent the zip code or destination of the piece of mail.

BACKGROUND OF THE PRESENT INVENTION

Conventionally, when a piece of mail (letter, postcard, parcel, or package) enters the postal system, the piece of mail will contain zip code information and a stamp unless the piece of mail has been metered by a postal metering machine. The zip code provides the postal system with information concerning the destination of the piece of mail, and the stamps demonstrates that the user has paid for the postal service.

In order to sort the piece of mail to its proper destination, the zip codes are either read by a machine or human wherein the zip code information is entered into a controller which controls the sorting and routing of the piece of mail to its next destination. Thus, the piece of mail is directed to the next distribution system based upon the entered zip code information.

However, when the piece of mail reaches the next sorting location, the zip code must be entered again so that it can be further directed to its next destination. Therefore, in order to properly sort a piece of mail through the postal system in which the zip code is read by a human, a number of different people must read the zip code from the piece of mail and enter this information into the control system so that the mail can be properly sorted. This requirement of having a number of different people entering the zip codes for proper sorting and distribution increases the potential number of mistakes in routing the piece of mail to its right destination, thereby decreasing the overall efficiency of the postal system.

One possible solution to the utilization of people to read and input the zip codes into the control system is to have the zip code printed on the piece of mail in the form of a machine readable barcode. This machine readable barcode can be printed on the piece of mail by either the sender or by the postal service's letter handling equipment. Presently, only commercial mail has utilized such machine readable barcodes because the use of machine readable codes on private letters may cause a negative public reaction. Thus, the utilization of a machine readable barcode has been restricted to use on commercial mail only.

Therefore, it is desirable to provide a system wherein the mail enters the postal system and the zip code is printed on the parcel, package, envelope, or post card as a machine readable code but the code is esthetically pleasing to the eye or undiscernible to the human eye so as to avoid any negative reaction by the public to encoding private letters or post cards with machine readable zip code information. In view of this desire, the present invention proposes the utilization of glyphs in the stamp cancellation mark, postal metering mark, or other postal mark to encode the zip code information so as to provide the proper sorting and distribution information to the postal system. The glyphs would be undiscernible to the human eye, thus avoiding any negative reaction from the public with respect to encoding machine readable zip code information on private letters or post cards.

SUMMARY OF THE PRESENT INVENTION

One aspect of the present invention is a method for embedding a postal code into a postal mark. The method includes inputting a destination zip code for a piece of mail; converting the destination zip code to zip code glyphs; generating a bitmap of the postal mark; embedding the zip code glyphs into a predetermined portion of the bitmap; and printing the postal mark bitmap with the embedded zip code glyphs onto the piece of metal.

Another aspect of the present invention is a system for embedding a postal code in a postal mark. This system includes input means for inputting a destination zip code for a piece of mail; controller means for converting the destination zip code to zip code glyphs and for embedding the zip code glyph into a predetermined portion of a bitmap representing the postal mark. The system further includes print means for printing the bitmap with embedded zip code glyphs onto the piece of mail.

A third aspect of the present invention is a system for embedding a postal code in a postal mark. This system includes an optical scanner to input a destination zip code for a piece of mail; a control unit to convert the destination zip code to zip code glyphs and to embed the zip code glyph into a predetermined portion of a bitmap representing the postal mark. The system further includes a printer to print the bitmap with embedded zip code glyphs onto the piece of mail.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
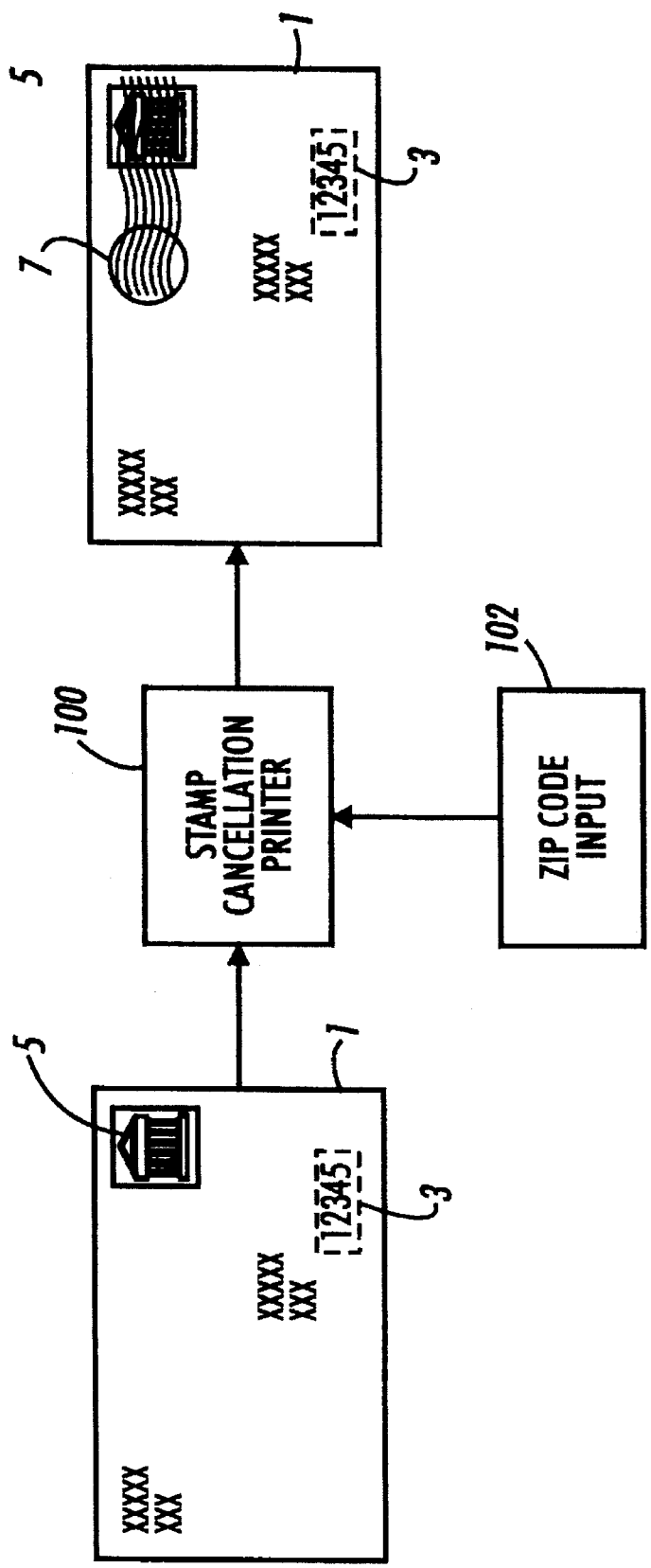
FIG. 1 is a block diagram showing a preferred embodiment of the present invention.

For a general understanding of the present invention, reference is made to the drawings. In the drawings and in the specification, like reference numerals are used throughout to designate identical or equivalent elements or steps.

FIG. 1 illustrates a block diagram of a preferred embodiment of the present invention. As illustrated in FIG. 1, a piece of mail 1, in this case an envelope, is placed into a stamp cancellation machine 100. The envelope 1 includes a stamp 5 and a destination zip code 3. A zip code input device 102, preferably a keyboard or other numeric or alpha/numeric entry device, inputs the destination zip code 3 into the stamp cancellation machine 100.

The destination zip code 3 can be entered by the zip code input device 102 through a keyboard wherein a human operator actually reads the destination zip code from the element and keys in this information. Also, the destination zip code 3 can be entered by the zip code input device 102 through an optical character recognition device which actually machine reads the alpha/numeric destination zip code information 3 from the envelope 1.

Once this destination zip code information 3 is entered by the zip code input device '102, the destination zip code 3 is converted to a set of glyphs by a control unit in the stamp cancellation machine 100 or the postal distribution system. A more thorough description of glyphs is set forth in U.S. Pat. No. A-5,315,098. The entire contents of U.S. Pat. No. A-5,315,098 are hereby incorporated by reference.

The control unit then merges or combines a bitmap of the stamp cancellation mark with the set of glyphs. The stamp cancellation mark along with the embedded zip code glyph information is printed upon the envelope 1 by a printer or printing device within the stamp cancellation machine 100 in the form of a stamp cancellation mark 7. A more detailed description of this stamp cancellation mark will be explained below with reference to FIGS. 3 and 4.

Figure 2:
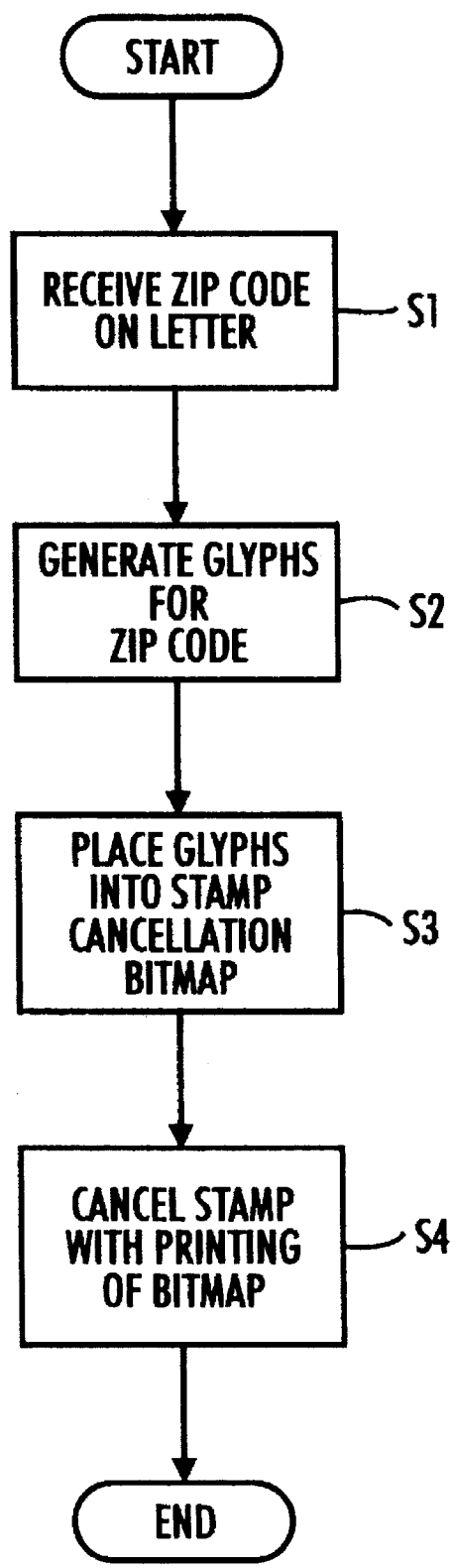
FIG. 2 is a flow chart showing a process carried out by one embodiment of the present invention.

FIG. 2 is a flowchart illustrating one of the methods carried out by the present invention in order to provide a stamp cancellation mark with the proper embedded glyph codes. As illustrated in FIG. 2, the process receives the destination zip code information that is printed on the letter at step S1. This received destination zip code information is then converted into glyphs which represents the destination zip code at step S2. As mentioned before, the glyphs representing the destination zip code are placed into or embedded into a stamp cancellation bitmap at step S3. Subsequently, the stamp on the envelope is cancelled at step 4 with the imprinting of the stamp cancellation bitmap and the embedded glyphs. The result of this stamp cancellation process is illustrated in FIG. 3.

Figure 3:
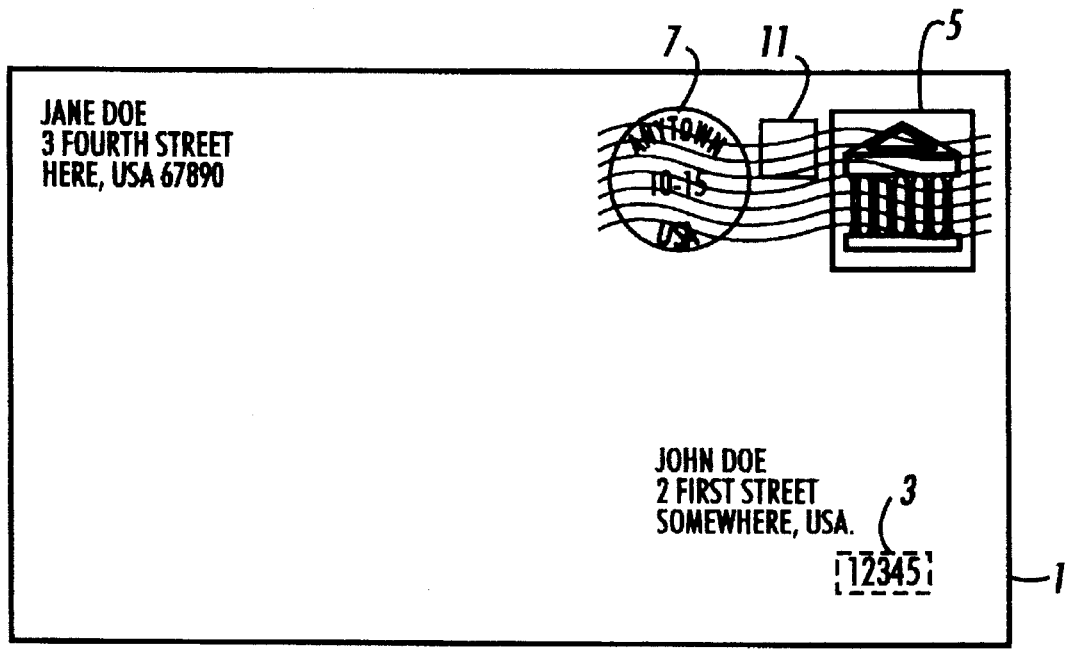
FIG. 3 illustrates a piece of mail having been cancelled by the system according to the present invention.

FIG. 3 illustrates an envelope 1 which has had a stamp cancellation process performed thereon according to the aspects of the present invention. As shown in FIG. 3, the envelope includes the original destination zip code information 3 printed in the lower right hand corner as well as the original stamp 5 placed in the upper right hand corner. However, upon being processed by the stamp cancellation machine 100 of the present invention or a stamp cancellation process embodying the concepts of the present invention, the envelope 1 further includes a stamp cancellation mark 7 with all or a portion of the glyph information embedded in area 11. Area 11 is further magnified and illustrated in FIG. 4.

Figure 4:
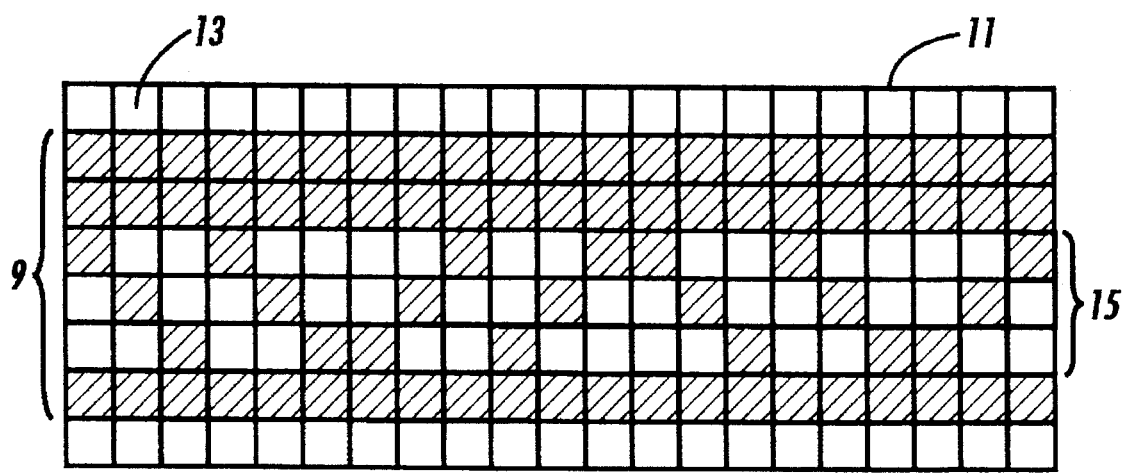
FIG. 4 illustrates an enlarged section of the stamped cancellation mark illustrated in FIG. 3.

As shown in FIG. 4, the stamp cancellation mark may include a plurality of wavy or straight cancellation lines 9. Normally, these cancellation lines 9 merely provide a set of marks to cancel the stamp located on the envelope. However, in the present invention, these cancellation lines 9 include embedded glyph information representing the destination zip code printed on the envelope 1.

More specifically, as illustrated in FIG. 4, glyphs 15 are embedded as part of the cancellation line 9 such that a machine can scan this cancellation mark and extract the glyphs so as to determine the actual destination zip code for that particular piece of mail. Each square 13 as illustrated in FIG. 14 represents a single pixel of the bitmap forming the cancellation mark. Thus, the glyphs, in the preferred embodiment, are represented by three pixels forming one of the two possible diagonals of a 3×3 pixel area (square).

Figure 5:
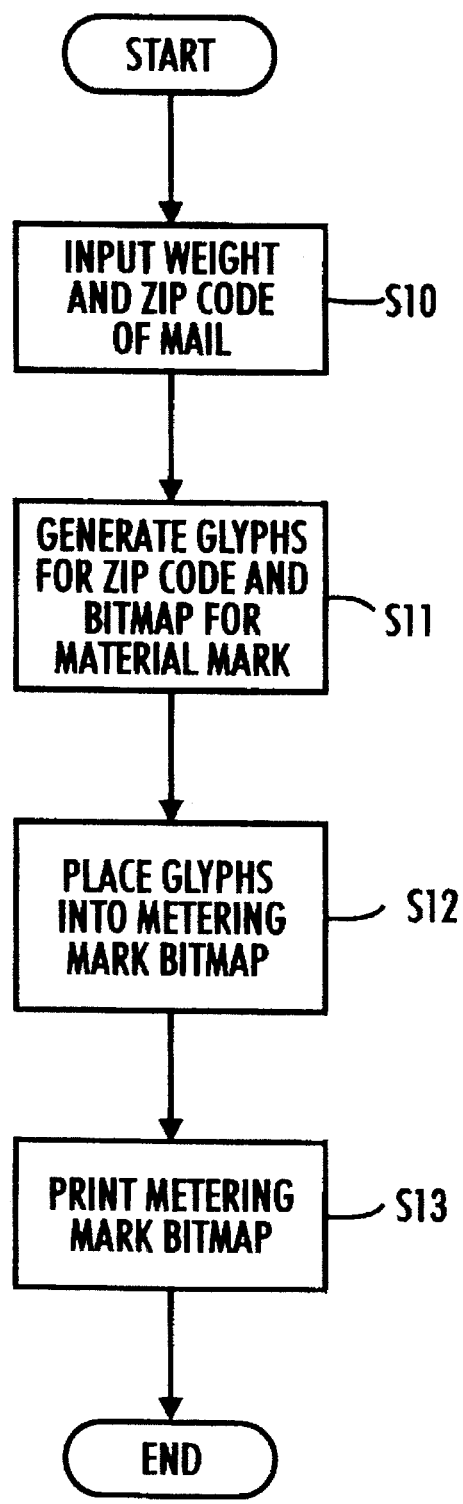
FIG. 5 is a flow chart illustrating another embodiment of the present invention.

FIG. 5 is a flow chart illustrating another embodiment of the present invention. In this embodiment, a private postal metering machine includes a glyph generator so as to embed glyph information in its metering mark. More specifically, the weight and destination zip code of the piece of mail being processed by the metering machine is entered or received at step S10. The postal metering machine then generates a set of glyphs representing the destination zip code and a bitmap for the metering mark at step S11. Thereafter, at step S12, the glyphs representing the destination zip code are placed into the metering mark bitmap to form a single metering mark bitmap. It is noted that the weight information can also be glyph encoded and embedded in the postal metering mark. This single metering mark bitmap is printed upon the envelope in the upper right hand corner at step S13 so that the piece of mail can be properly processed through the postal system.

As noted above, one of the features of the present invention is to provide glyph information in the stamp cancellation mark or postal metering mark so as to enable the piece of mail to be properly sorted and distributed through the postal system. Such a postal system incorporating the features of the present invention is illustrated in FIG. 6.

Figure 6:
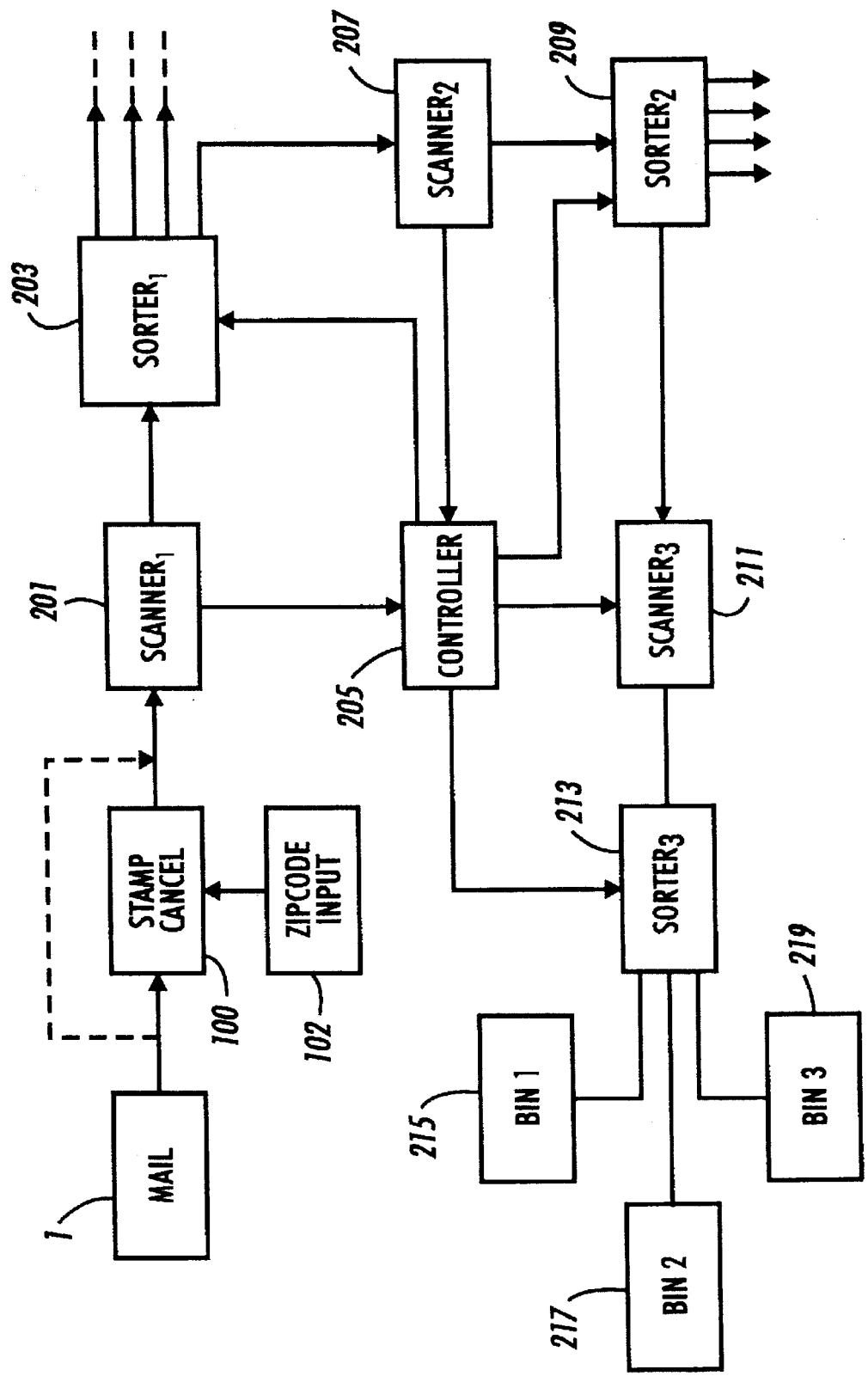
FIG. 6 is a block diagram illustrating a postal sorting system according to the aspects of the present invention.

As illustrated in FIG. 6, a piece of mail 1 enters the stamp cancellation machine 100 wherein the stamp is cancelled and the proper destination zip code information is embedded as glyphs into the stamp cancellation mark. The properly cancelled piece of mail 1 is then received by scanner 201. On the other hand, if the piece of mail has been processed by a postal metering machine utilizing the features of the present invention, the piece of mail 1 can be fed directly into the scanner 201 bypassing the stamp cancellation machine 100.

Scanner 201 then reads either the stamp cancellation mark or the postal metering mark in order to extract the glyphs representing the destination zip code. The extracted glyph information is fed to a controller 205 which utilizes this information to control a sorter 203. After the piece of mail 1 is scanned by scanner 201, it is fed into sorter 203 which directs the piece of mail to its next destination according to control signals received from controller 205.

Upon arriving at its next destination, the piece of mail 1 is read by another scanner 207 which performs the same functions as scanner 201. The piece of mail 1 is then passed onto sorter 209 which directs the mail to its next destination according to control signals received from controller 205.

After arriving at this new destination, the piece of mail 1 is again read by another scanner 211 which scans the stamp cancellation mark or postal metering mark to extract the proper destination and zip code information embedded in these marks. The controller 205 then controls sorter 213 to send the piece of mail 1 to either bin 215, bin 217, or bin 219. Thus, utilizing the concepts of the present invention in a postal sorting and distribution system, a machine can be utilized to read the embedded glyph information and properly sort and distribute the mail without error while maintaining an ecstatically pleasing envelope. It is noted that the postal system may have any number of scanners, sorters, etc. to carry out its sorting, distributing, and monitoring functions.

The present invention encodes a postal code into a postal mark which is printed upon an envelope. To encode such a postal code, the present invention receives a destination zip code for a particular piece of mail through either a keyboard, optical character reader, or other such input device. This destination zip code is then converted into glyphs which represent the destination zip code. The glyphs are then embedded into a bitmap representing the post mark to be printed upon the envelope.

In the preferred embodiment of the present invention, this post mark is a stamp cancellation mark which cancels the stamp presently on either an envelope or a post card or a package. In another embodiment of the present invention, the postal mark is a postal metering mark which is used by private metering devices to put the proper postage on an envelope instead of utilizing postal stamps. This postal mark is then printed upon the envelope such that the destination zip code is embedded in the printed postal mark as glyphs.

Upon entering the postal system, the embedded glyphs are extracted from the printed postal mark through the utilization of scanners. The extracted glyphs are then decoded in order to determine the actual destination zip code of the piece of mail. Upon decoding the extracted glyphs, the postal system sorts the piece of mail according to its destination zip code.

To encode the destination zip code information as glyphs into the postal mark, the zip code information can be entered manually through a keyboard or other input device or automatically through an optical character recognition system which is capable of reading the alpha/numeric zip code information from the envelope. This entered destination zip code information is then utilized to generate the glyphs which are to be embedded in the postal mark.

In another embodiment of the present invention, glyphs are used to monitor the postal system. In this embodiment, the present invention assigns a tracking number to each individual piece of mail. This tracking number is then converted to glyphs which are also embedded into a predetermined portion of the bitmap of the postal mark. Thus, both the destination zip code and the tracking number are converted to glyphs and printed on the envelope, post card, or packet, as part of the bitmap of the postal mark. The glyphs representing the tracking number can then be read at different points along the postal or mail handling system and decoded such that the postal system can accurately track and document the progress of the piece of mail through its system.

In a third embodiment of the present invention, the postal metering machine can convert time, place, date, sender, monetary value of the postal mark, address of origin or postal meter, and other postal information into glyphs. The glyphs are then embedded into the bitmap representing the metering mark and printed upon the envelope, or package. This information can then be utilized in the postal service to prevent fraud and to properly monitor the use of private metering system.

Lastly, glyphs can be incorporated into the actual stamp wherein the glyphs represent the actual postage value of the stamp. Thus, the postal system can then scan the postage stamp located on the piece of mail and extract the glyph portion from the stamp to determine if the monetary value of the stamp is proper with respect to the weight of the piece of mail being sent through the postal system. If the monetary value is proper, the postal stamp will be cancelled by the stamp cancellation device of the present invention such that the cancellation mark includes glyphs representing the destination zip code of the piece of mail.

While the present invention has been described with reference to various embodiments as disclosed above, it is not confined to the details set forth above, but is intended to cover such modifications or changes as may come within the scope of the attached claims.

What is claimed is:

1. A method for embedding a postal code and a tracking code in a stamp cancellation mark to be used in a mail handling system, comprising the steps of:

(a) inputting a destination zip code for a piece of mail;

(b) converting the destination zip code to zip code glyphs;

(c) generating a bitmap of the stamp cancellation mark;

(d) embedding the zip code glyphs into a predetermined portion of the stamp cancellation mark bitmap;

(e) printing the stamp cancellation mark bitmap with embedded zip code glyphs onto the piece of mail;

(f) reading the embedded zip code glyphs;

(g) decoding the read zip code glyphs;

(h) sorting the piece of mail according to the decoded destination information;

(i) assigning a tracking number to the piece of mail;

(j) converting the tracking number to track glyphs;

(k) embedding the track glyphs into a predetermined portion of the stamp cancellation mark bitmap;

said step (e) printing the stamp cancellation mark bitmap with the embedded track glyphs and zip code glyphs onto the piece of mail;

(l) reading the track glyphs at different points along the mail handling system;

(m) decoding the track glyphs; and (n) tracking and documenting a progress of the piece of mail through the mail handling system using the decoded track glyphs.

2. A system for embedding a postal code and a tracking code in a stamp cancellation mark to be used in a mail handling system, comprising:

input means for inputting a destination zip code for a piece of mail;

controller means for converting the destination zip code to zip code glyphs and for embedding the zip code glyphs into a predetermined portion of a bitmap representing the stamp cancellation mark;

print means for printing the stamp cancellation mark bitmap with embedded zip code glyphs onto the piece of mail;

an optical reader to read the embedded zip code glyphs;

said controller means decoding the read zip code glyphs;

a sorter, in response to said controller means, for sorting the piece of mail according to the decoded destination information;

means for assigning a tracking number to the piece of mail; and said controller means converting the tracking number to track glyphs and embedding the track glyphs into a predetermined portion of the stamp cancellation mark bitmap;

said print means printing the stamp cancellation mark bitmap with the embedded track glyphs and zip code glyphs onto the piece of mail;

a plurality of scanners to read the track glyphs at different points along the mail handling system;

said controller means decoding the track glyphs;

said controller means tracking and documenting a progress of the piece of mail through the mail handling system.

3. A system for embedding a postal code and a tracking code in a stamp cancellation mark to be used in a mail handling system, comprising:

- a scanner to input a destination zip code for a piece of mall;
- a control unit, operatively connected to said scanner, to convert the destination zip code to zip code glyphs and to embed the zip code glyphs into a predetermined portion of a bitmap representing the stamp cancellation mark;
- a printer, operatively connected to said control unit, to print the stamp cancellation mark bitmap with embedded zip code glyphs onto the piece of mail;
- a scanner to read the embedded zip code glyphs;
- a controller to decode the read zip code glyphs;
- a sorter, in response to said controller, to sort the piece of mail according to the decoded destination information;
- means for assigning a tracking number to the piece of mail; and
- said control unit converting the tracking number to track glyphs and embedding the track glyphs into a predetermined portion of the stamp cancellation mark bitmap;
- said printer printing the stamp cancellation mark bitmap with the embedded track glyphs and zip code glyphs onto the piece of mail;
- a plurality of scanners to read the track glyphs at different points along the mail handling system;
- said controller decoding the track glyphs;
- said controller tracking and documenting a progress of the piece of mail through the mail handling system.

* * * * *